United States Patent
Ruane et al.

(10) Patent No.: US 6,182,135 B1
(45) Date of Patent: *Jan. 30, 2001

(54) METHOD FOR DETERMINING WHETHER TWO PIECES OF NETWORK EQUIPMENT ARE DIRECTLY CONNECTED

(75) Inventors: James Ruane; James S. Binder, both of San Jose; Glenn William Connery, Sunnyvale, all of CA (US); Robert Pickering, Bucks (GB)

(73) Assignee: 3Com Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/019,461

(22) Filed: Feb. 5, 1998

(51) Int. Cl.[7] .................... G06F 15/173; G06F 15/177
(52) U.S. Cl. .................... 709/224; 709/220; 709/318; 709/321; 370/446; 370/466
(58) Field of Search .................... 709/218, 220, 709/221, 223, 224, 318; 370/466, 465, 410, 402, 248, 446; 340/825.5; 379/27

(56) References Cited

U.S. PATENT DOCUMENTS

| | | | |
|---|---|---|---|
| 5,048,009 | 9/1991 | Conrad | 370/252 |
| 5,218,601 | 6/1993 | Chujo et al. | 370/228 |
| 5,226,120 | 7/1993 | Brown et al. | 709/224 |
| 5,293,635 | 3/1994 | Faulk, Jr. et al. | 709/224 |
| 5,421,024 | 5/1995 | Faulk, Jr. et al. | 709/223 |
| 5,432,775 | * 7/1995 | Crayford | 370/248 |
| 5,617,418 | * 4/1997 | Shirani et al. | 370/465 |
| 5,687,174 | * 11/1997 | Edem et al. | 370/446 |
| 5,721,779 | 2/1998 | Funk | 713/155 |
| 5,815,577 | 9/1998 | Clark | 380/52 |
| 5,864,683 | 1/1999 | Boebert et al. | 709/249 |
| 5,923,663 | 7/1999 | Bontemps et al. | 370/445 |
| 5,944,794 | 8/1999 | Okamoto et al. | 709/225 |
| 6,038,600 | * 3/2000 | Faulk, Jr. et al. | 709/224 |

OTHER PUBLICATIONS

Ethernet IOP/Transceiver SQE Compatibility Algorithm, IBM Technical Disclosure Bulletin 91A 62699/RO8900490, Oct. 1991.*

* cited by examiner

Primary Examiner—Mark H. Rinehart
Assistant Examiner—Beatriz Prieto
(74) Attorney, Agent, or Firm—Wilson, Sonsini, Goodrich & Rosati

(57) ABSTRACT

A method by which a pair of communicating network equipment drivers can determine if the equipment they control such as a network adapter or a switch port are directly connected by a single network cable, is applicable to network protocols which include a link active signaling technique as part of the physical layer specification. The method includes determining whether the link is in a first state in which there is only one device coupled to the link without intervening devices which are members of a particular class, or in a second state in which there may be more than one device coupled to the link without intervening devices which are members of the particular class. If the link is in the first state, then a physical layer test involving the physical layer link active signaling mechanism is executed to ensure that the responding device is coupled to the same link without intervening devices that are not members of the particular class.

8 Claims, 5 Drawing Sheets

METHOD FOR DETERMINING WHETHER TWO PIECES OF NETWORK EQUIPMENT ARE DIRECTLY CONNECTED

CROSS REFERENCE TO RELATED APPLICATIONS

This application is related to U.S. patent application Ser. No. 09/019,462 entitled METHOD FOR DETECTING DEDICATED LINK BETWEEN AN END STATION AND A NETWORK DEVICE, filed Feb. 5, 1998.

BACKGROUND OF THE INVENTION

1. Field of the Invention

The present invention relates to the field of network management, and more particularly to processes for determining whether two communicating network drivers are directly connected across a physical link.

2. Background of the Invention

In the management of data networks, it is often desirable to understand the topology of the network, including whether there are direct links between particular devices in the network, the nature of the network intermediate devices which interconnect links or end stations on the network, and the capabilities of individual end stations on particular links. Thus, network management stations often maintain a topology map for the network to assist an administrator in the management of the network. A variety of techniques has been developed for automatically discovering the topology of the network to further automate the management of networks. See for example U.S. Pat. No. 5,421,024 entitled DETECTION OF A RELATIVE LOCATION OF A NETWORK DEVICE USING A MULTICAST PACKET PROCESSED ONLY BY HUBS invented by Faulk, Jr., et al.; see also, U.S. Pat. No. 5,293,635 entitled DETECTION ON A NETWORK BY A MAPPING APPLICATION OF A RELATIVE LOCATION OF A FIRST DEVICE TO A SECOND DEVICE invented by Faulk, Jr., et al.; U.S. Pat. No. 5,048,009 entitled BROADCAST STATION LOCATOR FOR A LOCAL AREA NETWORK invented by Conrad; and U.S. Pat. No. 5,226,120 entitled APPARATUS AND METHOD FOR MONITORING THE STATUS OF A LOCAL AREA NETWORK invented by Brown, et al.

Networks include intermediate devices which interconnect end stations and manage data flow among end stations and ports. Often, these intermediate devices are transparent to drivers running in the end stations or ports they interconnect. Thus, it is often difficult to determine whether there are intermediate devices between two communicating end points. Furthermore, it is often desirable to optimize performance of communication between communicating end stations which have drivers that are capable of certain classes of functions. Thus, automatic negotiation techniques have developed by which end points in a network negotiate the communication technique to be utilized between the end points. In these settings, it is sometimes important to ensure that there are no intervening devices between the devices negotiating the processes to be executed, which might not be able to operate under the ultimately negotiated process.

Thus, it is desirable to provide a technique which is capable of automatically determining whether there is a direct link between communicating end points on a network. Such a technique would be useful in systems which allow for automatic negotiation of network capabilities between communicating end stations, and in networks including automatic topology mapping techniques.

SUMMARY OF THE DISCLOSURE

In one embodiment, the present invention provides a method of determining if two pieces of network equipment which are controlled by communicating drivers at layer two and above, are directly connected. The present invention provides a mechanism by which a pair of communicating network equipment drivers can determine if the equipment they control, such as a network adapter, a switch port other end point, are directly connected by a single network cable. The invention is applicable to network signaling protocols which include a link active signaling technique as part of the physical layer specification. Examples include but are not limited to 10BaseT Ethernet, and 100BaseTX Ethernet where the link beat indicator is utilized. The method is useful for example to drivers who wish to auto configure or to avoid misconfiguration of the equipment they drive.

According to a first aspect of the invention, a method for determining whether a network device has a direct connection to another network device includes determining whether the link is in a first state in which there is only one device coupled to the link without intervening devices which are members of a particular class of intelligent hubs including switches, routers and other network intermediate devices that operate at level two or higher, or in a second state in which there may be more than one device coupled to the link without intervening devices which are members of the particular class. If the link is in the first state, then a physical layer test involving the physical layer link active signaling mechanism is executed to ensure that the responding device is coupled to the same link without intervening devices that are not members of the particular class.

The step of determining whether the link is in a first state or in a second state includes transmitting a message having a multi-destination MAC address on the link to notify devices which receive the message to issue a response carrying a MAC address of the responding device.

The multi-destination address falls within a special class of addresses so that packets on the network which have the multi-destination address are blocked by network devices which are members of the particular class, such as switches or routers or other network interconnecting devices having drivers that operate at layer two or higher, so that the packet does not propagate beyond such devices. After transmitting the message with the multi-destination address, the initiating network device waits a period of time for a response to the message. If no response is received within the period, then the transmitting and waiting steps are retried until a response is received or a retry limit is reached. If more than one response is received in the period, then it is determined that there may be multiple devices coupled to the link, such as by repeaters, without intervening devices that are members of the particular class. Finally, if only one response is received in the period, then a physical layer test is executed to ensure that the responding device is coupled to the same link without intervening devices that are not members of the particular class.

The physical layer test includes according to one aspect of the invention first selecting for the initiating network device one of a first process of dropping the link active signaling or a second process of monitoring the link for loss of the link active signaling from the network device. If the first process is selected for the network device, then the initiating network device drops the link active signaling on the link. After dropping the link active signaling, the initiating device waits for a period of time for a reply message from the responding device that indicates that the responding device detected the loss of the link active signaling. If no reply message is received within the waiting period, then the dropping and waiting steps are retried until a response is received or a retry limit is reached. If the reply message is received in the period, then it is determined that the responding device is directly connected to the initiating network device.

If the second process is selected for the initiating network device, then the process of monitoring the link for loss of the link active signaling from the responding device is executed. If loss of the link active signal is detected, then it is determined that the responding device is directly connected. If loss of the link active signal is not detected, then it is determined that there may be an intervening device that is not a member of the particular class on the link.

Accordingly, the network equipment driver operating according to the present invention first determines if it can establish communication with another network driver attached to the network. This is accomplished for example by sending an "exchange information" packet to the multicast address. The particular multicast address will not propagate through switches or network equipment implementing the point-to-point detection mechanism of the present invention. If more than one response is received to the request, then this implicitly means that the network equipment is not directly attached to that driven by any of the responders. If no response is received then a determination cannot take place. If a single response per request is received, then either of the two communicating network nodes can initiate the physical point-to-point determination method. To do so, for example an "initiate direct link determination request" frame is sent from the initiator to the peer end point. Specific addressing is used for this frame. Once a response is received for the initiate request, then the driver having the lowest incremental MAC address, or other intentionally or arbitrarily selected driver amongst the peer devices will monitor for the link beat indicator. The other driver removes the link beat and holds it low for a period of time.

The driver which held the link beat low will then restore the link beat and send a frame to the peer driver requesting notification that the peer driver noticed the removal of a link beat. A determination of a direct connection is made on the basis of that removal of the link beat. Thus, if two network devices are directly connected, then if one of the devices removes its link beat indicator the other should be able to detect it. However, if there is an intermediate network device between the two nodes, when one of the devices removes its link beat, the other will not detect it because it will be blocked by the intervening device.

Accordingly, a technique for determining whether there is a direct connection between network devices is provided that is useful in automatic configuration algorithms or other systems in which information about configuration of the network is useful for network management.

Other aspects and advantages of the present invention can be seen upon review of the figures, the detailed description and the claims which follow.

DETAILED DESCRIPTION

Figure 1:
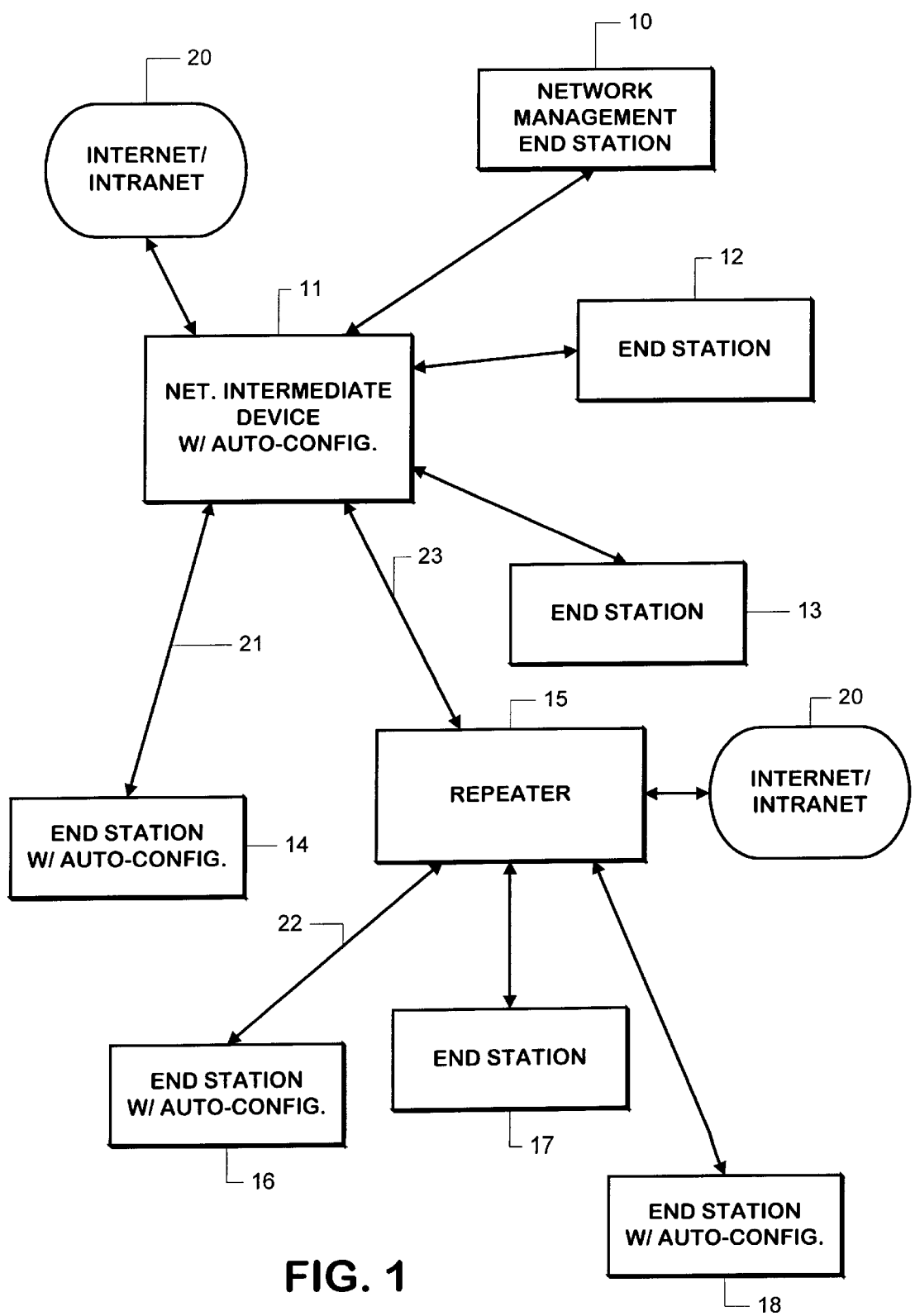
FIG. 1 is a simplified diagram of a network including the automatic configuration and direct link detection of one embodiment.

A detailed description of the embodiments of present invention is provided with respect to FIGS. 1–7, in which FIG. 1 illustrates a context in which embodiments of the invention may be used. In FIG. 1, a simplified diagram of a data network is illustrated. The data network includes a network management end station 10 which includes resources for managing information about the topology of the network and other resources used by a network administrator for network management. The network management end station is connected to a network intermediate device 11, which includes auto configuration resources including the direct link detection routine of the present invention. The network intermediate device is connected to the Internet or an Intranet as indicated by cloud 20. Also, the network intermediate device 11 is connected to end station 12, end station 13, end station 14, and to a repeater 15. The end station 14 includes the auto configuration routine with a direct link detection of the present invention for this example. The repeater 15 is also connected to end station 16, end station 17, and end station 18. Also the repeater is coupled to the Internet or an Intranet 20. In this example, the end station 16 and the end station 18 include auto configuration routines with direct link detection.

Typically, an end station, such as end station 14, must detect an optimum signaling protocol for communication across link 21 to the network intermediate device 11. Thus, the drivers running in the end station 14 and in the network intermediate device 11 communicate with one another across the link 21 to resolve the signaling protocol. For example, it may be necessary to resolve whether the network intermediate device 11 is capable of running 100 Megabit Ethernet or 10 Megabit Ethernet. Also it may be important to resolve whether full duplex or half duplex operation is supported. By communicating amongst the drivers, the best technique can be determined upon initiation of the connection by link 21. Also, if it is known that there is a direct link between the two devices, the signaling protocol can be modified as traffic requires by dynamic configuration routines. Thus, a direct link between end station 14 and network intermediate device 11 could be communicated to a network management end station 10 for dynamic management of the network. Alternatively, the network intermediate device 11 itself could include routines that allow for dynamic management.

This situation can be contrasted with the end station 16 which is coupled via repeater 15 to the network intermediate device 11. In this situation, end station 16 is not directly connected to the network intermediate device 11. Thus, the driver in the network intermediate device 11 and the driver in the end station 16 could not resolve the signaling protocol across link 22 between the repeater and the end station, nor could they resolve the signaling protocol across the link 23 between the network intermediate device and the repeater 15. This would be true in part because any communication between the end station and the network intermediate device would also be heard by end station 17 and end station 18.

Figure 2:
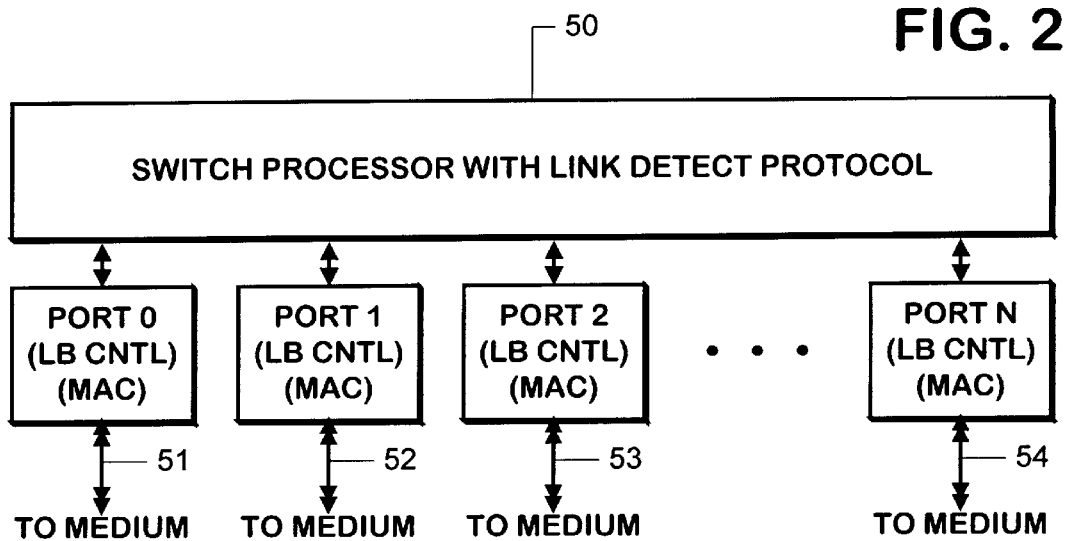
FIG. 2 is a simplified diagram of a network intermediate device including the link detect protocol of one embodiment.
Figure 3:
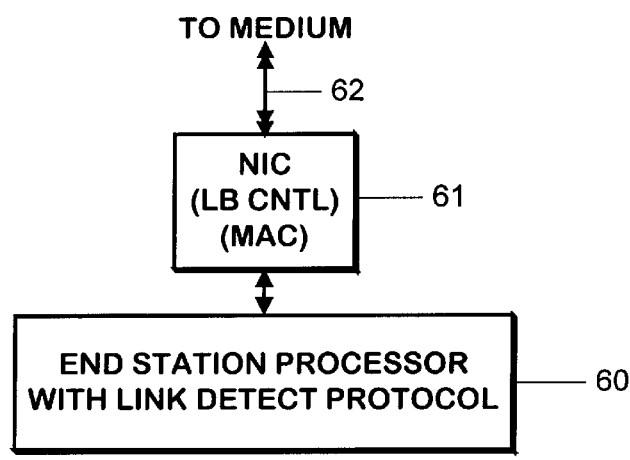
FIG. 3 is a simplified diagram of an end station having the link beat detect protocol of one embodiment.

FIGS. 2 and 3 provide simplified diagrams of the network devices which operate according to an auto configuration protocol of one embodiment. In FIG. 2, a network intermediate device is illustrated which includes a plurality of ports, port 0 through port N, that provide for interconnection of end stations and links in a network. In this example, a switch is illustrated which includes a switch processor 50, which includes a driver that includes a link detect protocol. The driver manages communication across the plurality of ports, port 0-port N onto respective network media 51–54 in the drawing.

Each port in the network intermediate device of FIG. 2 includes a link beat control circuit and a medium access control (MAC) unit. The link beat control circuit manages a physical layer link active signaling technique by which interconnected devices can determine whether a device coupled to the link is active. Thus for example in 10BaseT or 100BaseTX Ethernet, link beat pulses are generated to indicate an active link.

FIG. 3 illustrates an end station which includes a driver supporting the link detect protocol. Thus, the end station of FIG. 3 includes an end station processor 60 and a network interface card 61 that comprises a network adapter having a link beat control circuit and a medium access control MAC unit. The network interface card 61 is coupled to a communication medium 62, having on the opposite end a connection to another network device.

Figure 4:
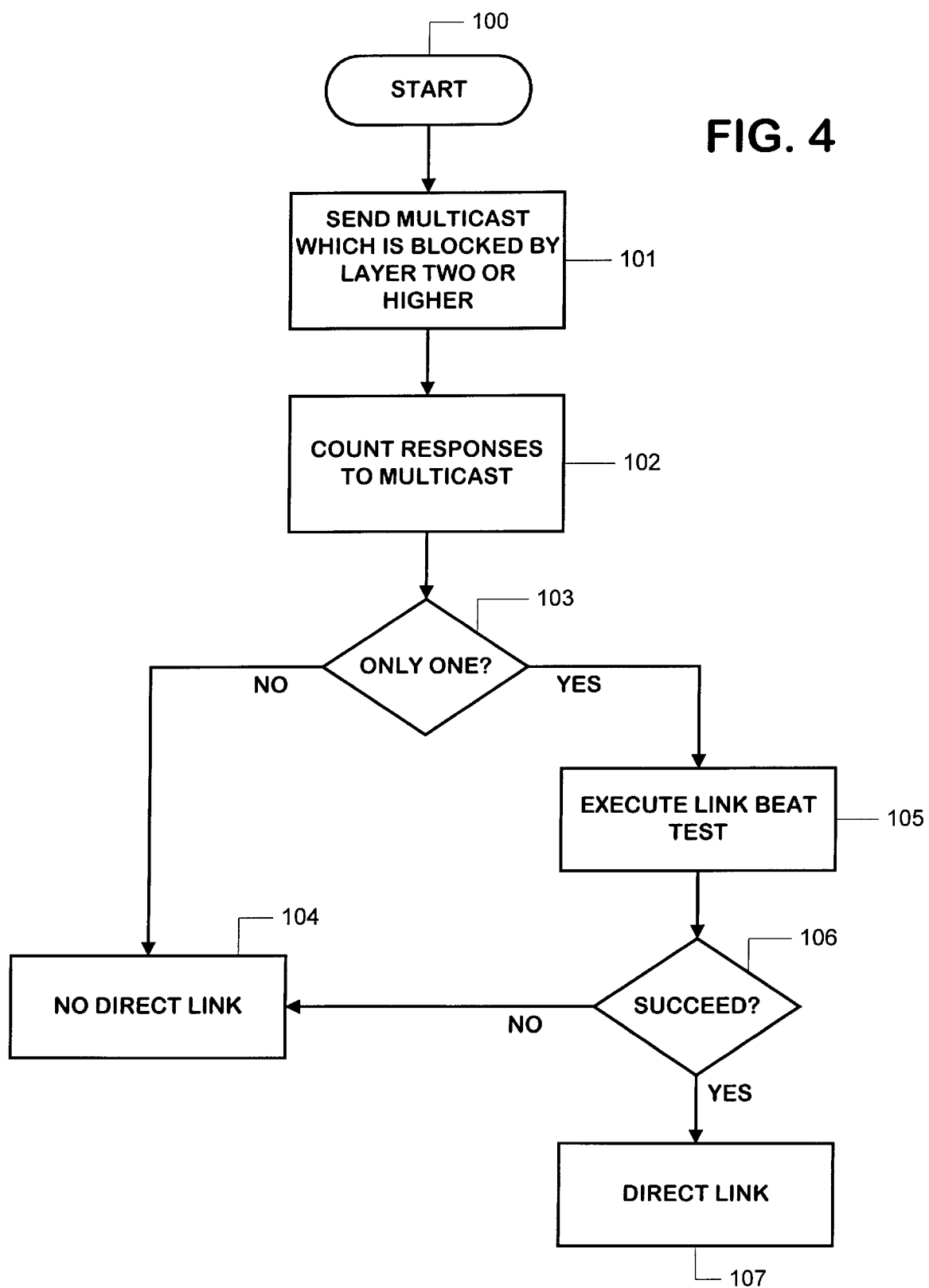
FIG. 4 is a flow chart of the direct link detection protocol of one embodiment.
Figure 5:
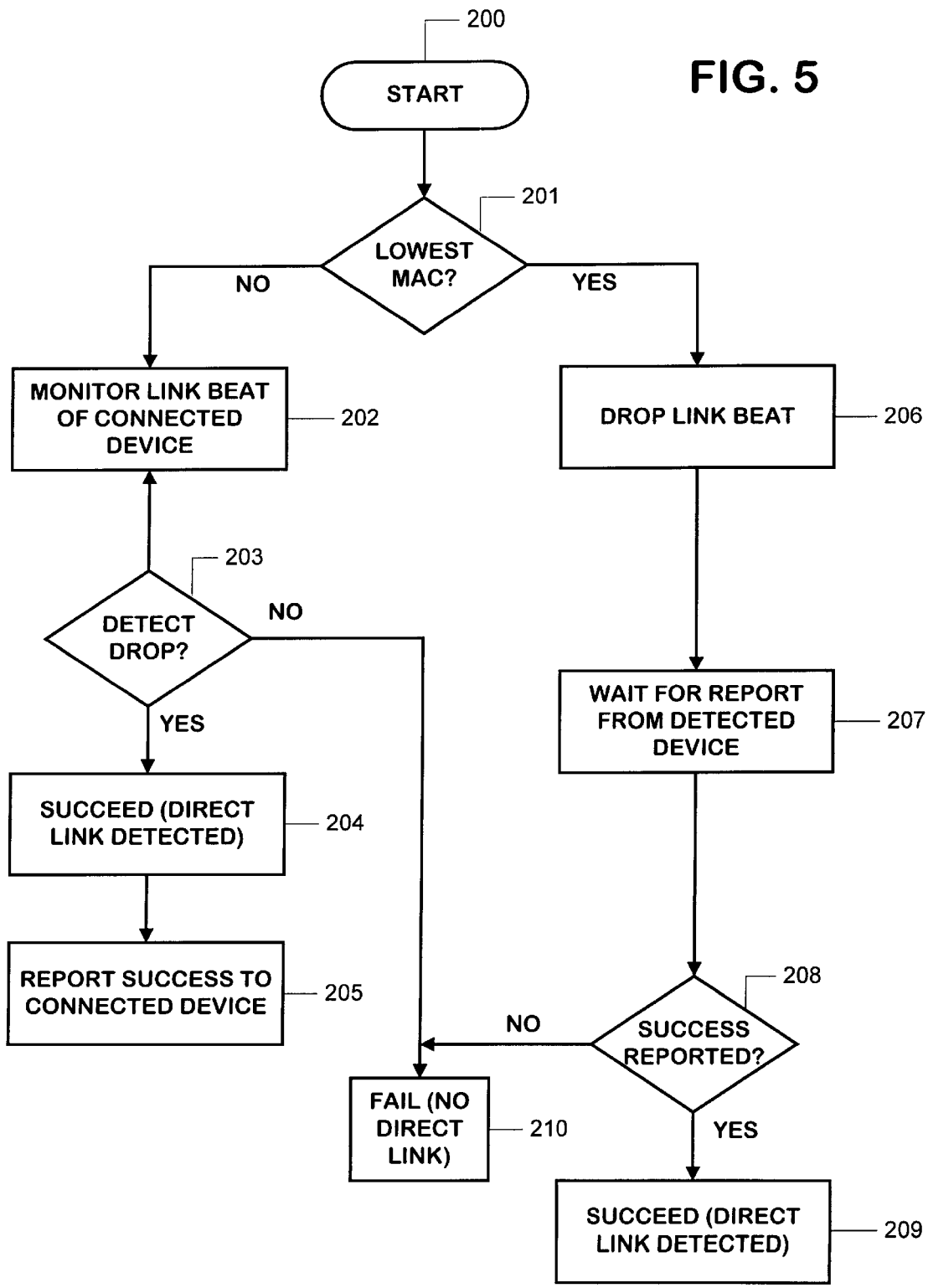
FIG. 5 is a flow chart of one example physical layer link beat test of one embodiment.

FIG. 4 illustrates one example protocol for establishing a direct link between devices. The protocol starts as indicated at block 100. The first step involves determining whether the driver can establish communication with another network driver attached to the network. This is accomplished by sending an exchange information packet to a multicast address (or other multi-destination address), in which the multicast address does not propagate through switches or other network equipment that include drivers operating at the same level as, or alternatively include, drivers which implement the point-to-point detection algorithm of the present invention (block 101). Thus for example with reference to FIG. 1, the multicast address would be blocked by the network intermediate device 11 but not by the repeater 15. The network intermediate device 11 could respond, but repeater 15 normally could not because it would not have a driver capable of processing the multicast packet. The devices participating in the protocol which receive the exchange information packet will issue a response which carries its MAC address and other identifying information as appropriate. If more than one response to the exchange information packet is received by the requesting driver, then this means that the network equipment is not directly attached to that driven by any of the responding devices. Thus for example, if end station 16 sent the exchange information packet, then it could receive responses from end station 18 and network intermediate device 11, and possibly from end station 17 or other end stations out in the Internet 20. Thus it would be clear that end station 16 is not directly connected to any of its responding devices, and that it communicates through intervening network devices that fall outside of the class of network devices that block the exchange information packet.

If no response is received to the packet, then a determination cannot take place. Either the device on the other end of the link is not capable of responding to the exchange information packet, or some error has occurred.

If no response is received, then the exchange information packet is sent a number of times, for example 5 times in sequence with a delay, of for example 50 milliseconds between the sends. The responses to the multicast addresses are counted within each time period (block 102). Next it is determined if only one response is received within the time interval (block 103). If zero or more than one response is received, then the algorithm determines there may be no direct link (block 104). If only one response is received within the period, then a physical layer link beat test is executed (block 105). The algorithm then tests whether the link beat test is successful (block 106). If it is successful, then it is determined that there is a direct link (block 107). If it is not successful at block 106, then it is determined that there is no direct link (block 104).

In order to execute the link beat test of block 105, either of the two communicating network nodes can initiate a point-to-point termination method of one embodiment. Thus, for example an "initiate direct link determination request" frame is sent from the initiator to the responding end point. Specific addressing is used for this "initiate direct link determination request". This process is then picked up in FIG. 5 by starting at block 200. If there is no response to the "initiate direct link determination request", then the frame is sent multiple times, for example three times, with a delay between frames, for example 50 milliseconds. If no response is received, then the algorithm returns to the process of FIG. 4 to retry detection of a direct link at the higher layer. Once a response is received from the "initiate direct link determination request", one of the nodes executes a first process which includes monitoring the link for received packets and for link beat indicators, and the other of the nodes executes a second process of dropping the link beat indicator. To select a process the driver having the lowest MAC address is determined (block 201). Alternatively, other techniques could be utilized to determine which of the communicating nodes will perform which process. In this example the driver with the higher MAC address performs the first process (block 202). If the monitoring device detects a dropped link beat indicator as indicated at block 203, then a direct link has been detected (block 204). Success is then reported to the connected device (block 205).

The other device in the communicating pair executes a second process, in this example it is the device having the lowest MAC address, which involves dropping the link beat indicator (block 206). The link beat indicator is removed by this device and it is held low for a time interval for example 50 milliseconds. The driver which drops the link beat indicator at block 206 restores the link beat and sends a frame to the peer driver requesting if it noticed the removal of the link beat. The device then waits for a report from the detected device indicating whether it noticed the dropped link beat (block 207). If the dropped link beat is detected and success is reported as indicated at block 208, then a direct link has been detected (block 209). If success is not reported at block 208, or if the drop is not detected at block 203, then the process fails and it cannot be determined that there is a direct link (block 210).

Figure 6:
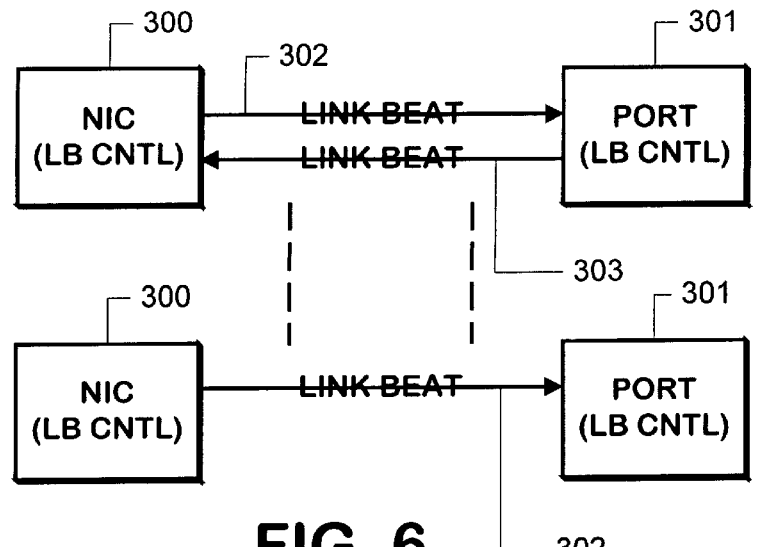
FIG. 6 is a heuristic diagram used for illustrating operation of one embodiment.
Figure 7:
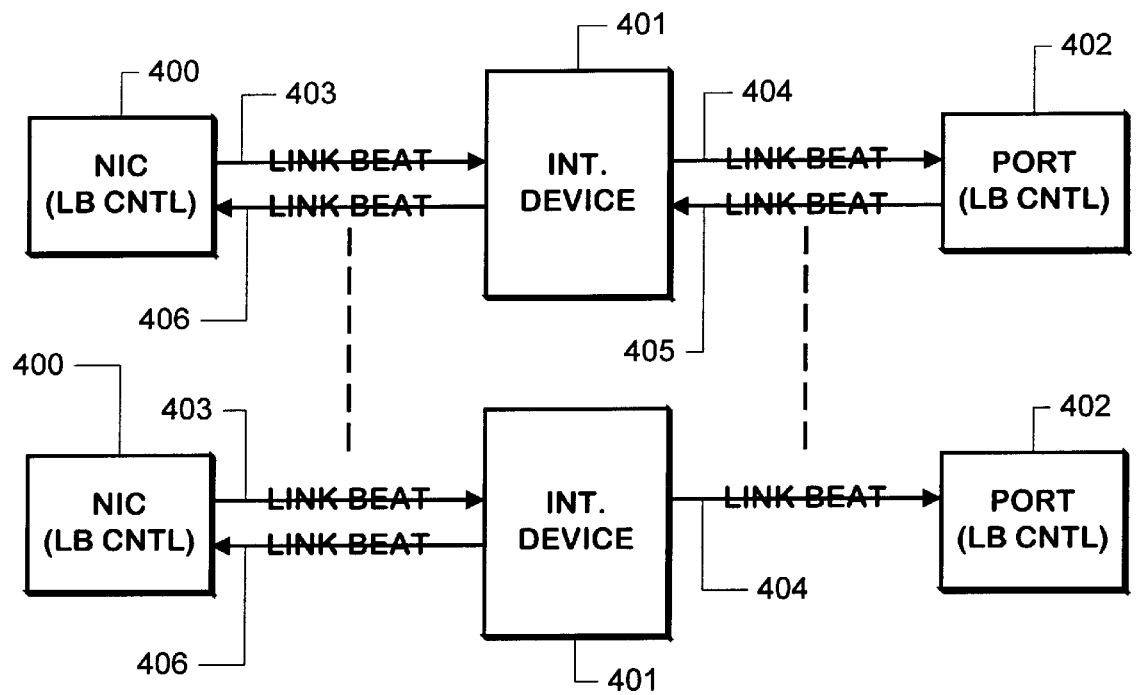
FIG. 7 is a heuristic diagram used for illustrating operation of one embodiment.

FIGS. 6 and 7 illustrate the effect of the link beat process of the present invention. In FIG. 6, two directly connected devices are illustrated; a network interface card 300 and a port 301 on a network intermediate device. In normal operation the network interface card issues a link beat indicator as indicated by arrow 302 to the port 301. Also, the port 301 issues a link beat indicator as indicated by arrow 303 to the network interface card 300. If the port 301 drops the link beat indicator as indicated by the removal of arrow 303 in the bottom pairing of FIG. 6, then the network interface card is able to detect the dropped link beat and establish that there is a direct link.

In contrast FIG. 7 illustrates the function in the event that there is an intervening device that was not detected in the higher layer message exchanges. Thus, in this example, there is a network interface card 400, an intermediate device 401, and a port 402 on a responding device. In this setting, the network interface card 400 issues a link beat indicator as indicated by arrow 403 and the intermediate device 401 issues a link beat indicator 406. Also the intermediate device 401 issues link beat indicator 404 to the port 402 which returns a link beat indicator 405. If the port removes the link beat indicator 405, the network interface card 400 does not detect it because of the intervening device 401 as illustrated in the lower part of FIG. 7.

Accordingly, embodiments provides a mechanism by which a pair of communicating network equipment drivers can determine if the equipment they control, such as a network adapter or a switch port are directly connected by a single network cable. Embodiments described are applicable to network topologies that include a link active indicator as part of their physical layer specifications, such as the link beat indicator of 10BaseT and 100BaseTX Ethernet. Methods described are useful to drivers that wish to auto-configure or at least not misconfigure the equipment they drive.

The foregoing description of various aspects of the invention has been presented for purposes of illustration and description. It is not intended to be exhaustive or to limit the invention to the precise forms disclosed. Many modifications and variations will be apparent to practitioners skilled in this art. It is intended that the scope of the invention be defined by the following claims and their equivalents.

What is claimed is:

1. A method for determining whether a first device in a network is connected by a direct link to a second device in the network, comprising:

the first device sending an exchange information packet to a multicast address, wherein the exchange information packet does not propagate through devices at a same level as the first device;

the first device counting a number of responses to the exchange information packet received by the first device;

if the number of responses received is more than one, the first device determining that there is no direct link between the first device and the second device; and if the number of responses received is one, executing a link beat detect test, wherein the first device and the second device perform respective processes comprising dropping a link beat and detecting a dropping of the link beat.

2. The method of claim 1, wherein the link beat detect test comprises:

the first device sending a packet to the second device using specific addressing, comprising the first device sending the packet multiple times;

the first device monitoring for response packets;

the first device monitoring for a dropped link beat indicator;

the second device dropping a link beat indicator, comprising holding a link beat indicator low for a predetermined period;

the second device sending a query to the first device regarding whether the first device notices the dropped link beat indicator; and if the first device responds to the second device, the second device determining that there is a direct link.

3. The method of claim 2, wherein:

the first device is a driver with a first media access control (MAC) address; and the second device is a driver with a second MAC address, wherein the second MAC address is lower than the first MAC address.

4. The method of claim 3, wherein the first device is a driver in a network switch processor.

5. The method of claim 4, wherein the second device is a driver in a network end station comprising a network interface card (NIC).

6. The method of claim 3, wherein the second device is a driver in a network switch processor.

7. The method of claim 6, wherein the first device is a driver in a network end station comprising a network interface card (NIC).

8. The method of claim 1, wherein the first device sending an exchange information packet to a multicast address comprises the first device sending the exchange information packet a predetermined number of times in a predetermined time period; and wherein the first device counting a number of responses to the exchange information packet comprises counting a number of responses received within the predetermined time period.

* * * * *